(12) United States Patent
Burgstaler et al.

(10) Patent No.: US 7,059,213 B2
(45) Date of Patent: Jun. 13, 2006

(54) HOLDING DEVICE FOR THE PEDALS OF A MOTOR VEHICLE

(75) Inventors: Andree Burgstaler, Dielingen (DE); Jan Dütz, Damme (DE); Simone Pätzold, Cappeln (DE)

(73) Assignee: ZF Lemförder Metallwaren AG, Stemwede-Dielingen (DE)

( * ) Notice: Subject to any disclaimer, the term of this patent is extended or adjusted under 35 U.S.C. 154(b) by 233 days.

(21) Appl. No.: 10/239,433

(22) PCT Filed: Jan. 31, 2002

(86) PCT No.: PCT/DE02/00331

§ 371 (c)(1),
(2), (4) Date: Sep. 20, 2002

(87) PCT Pub. No.: WO02/060731

PCT Pub. Date: Aug. 8, 2002

(65) Prior Publication Data

US 2003/0140726 A1    Jul. 31, 2003

(51) Int. Cl.
*G05G 1/14* (2006.01)
(52) U.S. Cl. ............................................. 74/512
(58) Field of Classification Search ............. 74/512, 74/513, 560, 562; 277/591, 598, 628, 637; 180/274, 315, 335; 248/200
See application file for complete search history.

(56) References Cited

U.S. PATENT DOCUMENTS

| 5,896,781 A | 4/1999 | Müller |
| 6,027,088 A * | 2/2000 | Stedman et al. ............ 248/200 |
| 6,426,619 B1 * | 7/2002 | Pfaffenberger et al. .. 324/207.2 |
| 6,553,864 B1 * | 4/2003 | Ersoy et al. .................. 74/512 |

FOREIGN PATENT DOCUMENTS

| DE | 199 27 618 | 12/2000 | |
| EP | 0 430 600 | 6/1991 | |
| JP | 55-55022 | * 4/1980 | .................. 74/512 |

* cited by examiner

*Primary Examiner*—Vicky A. Johnson
(74) *Attorney, Agent, or Firm*—McGlew & Tuttle, P.C

(57) ABSTRACT

A holding device for the pedal mechanism of a motor vehicle is presented, which has at least one pedal block (1, 2) with pedals (4, 6) fastened thereto pivotably and a baseplate (3). The baseplate (3) and the pedal block (1, 2) are made of plastic in one piece. The pedal block (1, 2) for holding a pedal (4, 6) has a mount for the pivot axis of the respective pedal (4, 6). The mount is made of two side walls (8, 9, 10, 11) located opposite each other. The side walls (8, 9, 10, 11) are formed of sheet metal and the mount is injection molded in the plastic pedal block. The sheet metal mount forms a deformation device for the release of the pivot axis (5, 7) in the case of an accident of the motor vehicle.

20 Claims, 5 Drawing Sheets

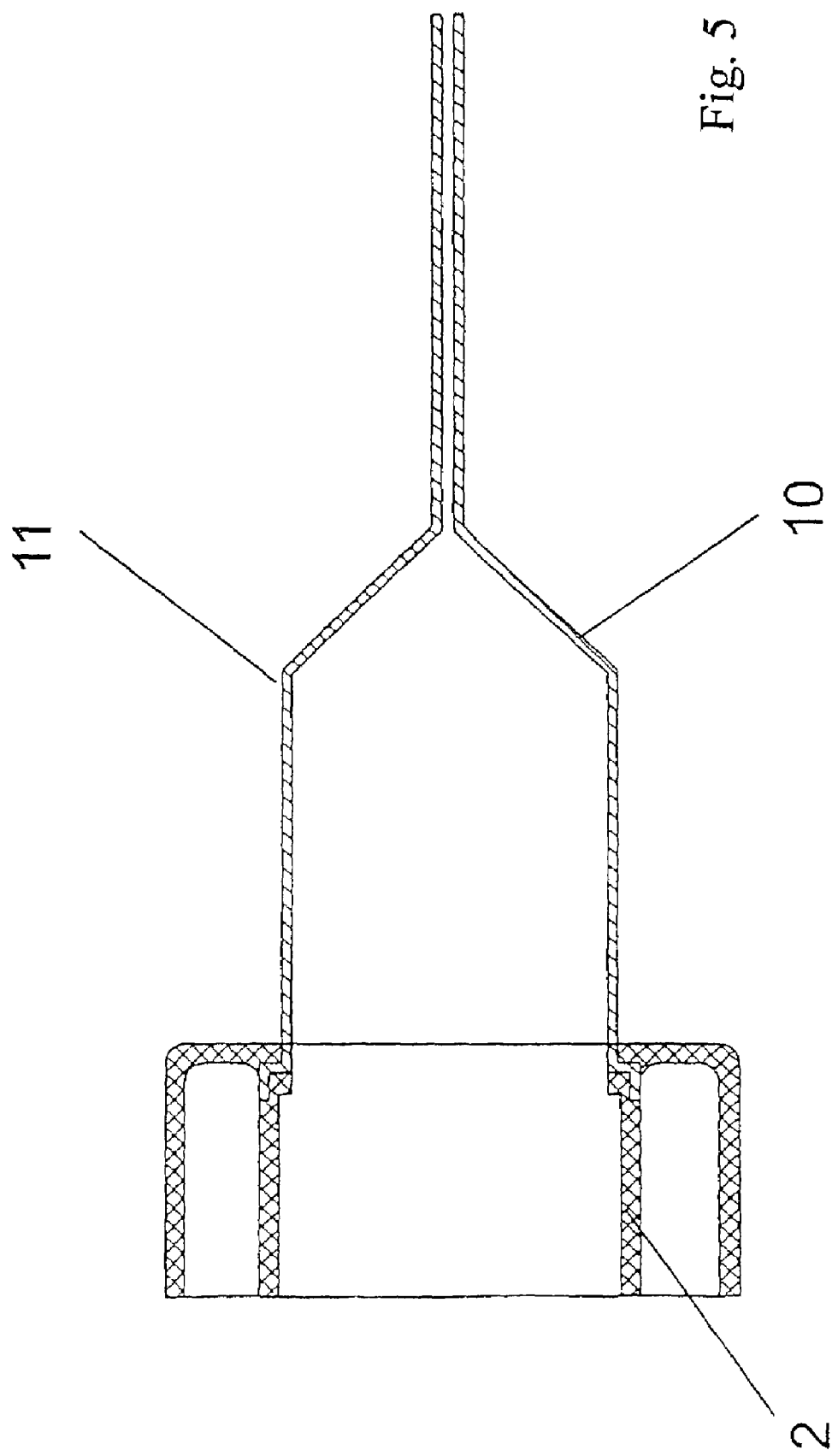

HOLDING DEVICE FOR THE PEDALS OF A MOTOR VEHICLE

FIELD OF THE INVENTION

The present invention pertains to a holding device for the pedal mechanism of a motor vehicle, which usually contains at least one brake pedal and a gas pedal and, moreover, in vehicles with manually shifted transmission, additionally a clutch pedal.

BACKGROUND OF THE INVENTION

Holding devices of the type described in the introduction are known in many different designs in the automobile industry. They comprise essentially the pedal block with the pedals fixed to them pivotably and a baseplate, to which the pedal block is fixed, and which is in turn fixed usually to the firewall of a motor vehicle, e.g., by means of screw connections. The pedal blocks and the baseplate may be manufactured from sheet metal or diecast magnesium or aluminum, and pedal blocks that are screwed directly to the vehicle without a baseplate have been known as well.

Recent developments have been made in the area of the holding devices for the pedal mechanism of motor vehicles point, toward making the pedal block in one piece with a baseplate from a plastic. In this case parts of the brake booster housing may be additionally made in one piece with the plastic baseplate on the side facing away from the pedal block.

To avoid risks of injury to the driver of the vehicle, pedal separation mechanisms have been known, which utilize the introduction of force from the outside, which is caused by an accident, to drive at least one separating wedge between two metallic side walls of a mount on which the pedal lever or the pedal levers is/are pivotably mounted in order to make possible as a result the release of the bearing element carrying the pedal lever. These designs, which form a deformation device, are also known as a "pedal release system." They bring about the release of the pivot axis and consequently the separation of the pedal from the pedal block, so that the penetration of the pedal into the passenger compartment of the motor vehicle, which would be caused by an accident, is prevented from occurring. The holding devices used in such release systems have the drawback that the design possibilities are limited, especially concerning the geometric design of the metallic components, and the metallic components have an increased weight, which counteracts especially the efforts to have a consistent lightweight design in motor vehicle manufacture. Moreover, the systems known hitherto are very bulky and have a complicated design, so that their mounting and removal is complicated and consequently rather difficult.

SUMMARY OF THE INVENTION

The object of the present invention is therefore to provide a holding device for the pedal mechanism of a motor vehicle, which offers the advantage of a great freedom in design in the use of the holding device within the framework of a pedal release system and is, moreover, characterized by reduced weight and simpler manufacture. Furthermore, the present invention shall accomplish the object of meeting the requirements of modern motor vehicle manufactures in terms of the modular design of assembly units, which makes it possible to considerably reduce the depth of manufacture.

According to the invention, a holding device for the pedal mechanism of a motor vehicle has a pedal block with pedals fixed thereto in a pivotable manner and a baseplate. The baseplate and the pedal block are made of plastic in one piece. The pedal block for holding a pedal has a mount for a pivot axis of the pedal. The mount is formed by two side walls located opposite each other. The two side walls are sheet metal and the mount is injection molded into the plastic pedal block. "Injection molded" means in this connection that plastic is injection molded at least partially around the mount and the side walls in a plastic injection molding operation during the manufacture of the holding device according to the present invention. The mount, consisting of sheet metal, forms a deformation device for the release of the pivot axis of the pedal in the case of an accident of the motor vehicle.

Such a design embodiment unites the hitherto conflicting advantages of a holding device known from the state of the art, which is made of sheet metal, and the advantages of a construction made of plastic. The mount manufactured from sheet metal is a component that can be accurately determined by calculation with respect to deformations occurring in an accident for the pivot axis of the particular pedal. In addition, the side walls, in which the pivot axis is accommodated, can be manufactured by means of an inexpensive process together with the rest of the one-piece holding device. Due to the one-part design according to the present invention, cumulative tolerances are, moreover, avoided, so that it was possible to achieve, on the whole, a considerable reduction in the tolerance of the holding device.

Furthermore, the fact that the holding device is made of plastic in one piece substantially increases the design possibilities of optimally utilizing the conditions prevailing in the area of the firewall and of fully or partially integrating supplementary components in the baseplate and/or the pedal block.

According to one embodiment of the present invention, it is, moreover, proposed that the baseplate have a seal injection-molded according to the two-component process (2 C process) on the rear side facing away from the pedal block for sealing an opening provided in the motor vehicle body for the baseplate. The injection molding of the seal substantially reduces the depth of manufacture.

It also proved to be advantageous to already integrate a clutch master cylinder and/or a vacuum tank, which is necessary especially in modern diesel-powered vehicles, in the baseplate of the housing.

Corresponding to another advantageous embodiment of the subject of the present invention, the mount for a pivot axis of the pedal, which is made of two side walls located opposite each other, consists of sheet metal and is injection molded in the pedal block, may have a hole, which is coated with plastic during the manufacture of the holding device and forms a bearing element after the completion of the holding device.

To make it possible to lead components such as a steering cross-shaft through the baseplate, it is proposed according to a variant of the present invention that an opening be provided in the baseplate, the opening having a seal extending around the steering cross-shaft and closing the opening with the steering cross-shaft installed. The introduction of the steering cross-shaft into the holding device offers advantages in terms of the reduction of the depth of manufacture, because the holding device as a component module has in its entirety additional components that can be automatically fastened to the holding device at the firewall during the finishing of a motor vehicle. The total number of individual components to be supplied decreases as a result during the final assembly.

In addition, provisions are made in the advantageous embodiment of the present invention for the baseplate of the holding device to have the mount, e.g., in the form of a mounting plate, for an electronic module unit for detecting the position of the gas pedal and for transmitting the data determined in the process to downstream assembly units (E gas module). The integration of this mount in the baseplate facilitates the mounting of such an E gas module, which can now likewise be performed before the final assembly. Moreover, it is possible to integrate additional mounts for switching devices, brackets and stops in both the baseplate and the plastic area of the pedal block.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 5 is a sectional view corresponding to line C—C in FIG. 2.

DESCRIPTION OF THE PREFERRED EMBODIMENT

Figure 1:
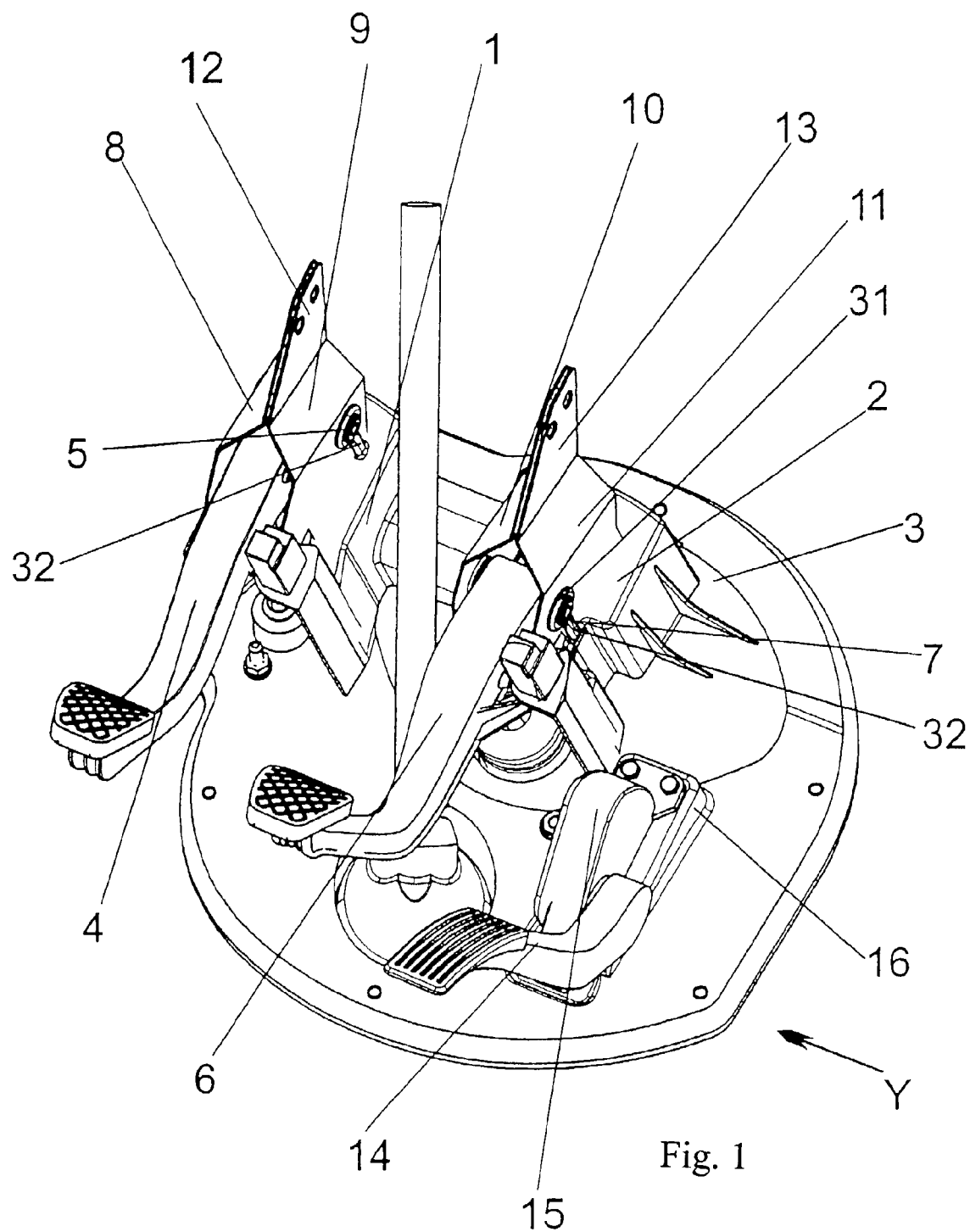
FIG. 1 is a synoptic perspective view of the holding device according to the present invention from the passenger cell side.

Referring to the drawings in particular, the holding device for the pedal mechanism of a motor vehicle is shown in FIG. 1. The holding device has two pedal blocks 1, 2 as well as a common baseplate 3. The pedal block 1 is used for the pivotable mounting of a clutch pedal 4 by means of a pivot axis 5. A brake pedal 6 is mounted in the pedal block 2 by means of a pivot axis 7. The two pivot axes 5 and 7 are located in the front area of the pedal blocks 1 and 2 facing away from the baseplate 3. These front areas are formed from sheet metal and comprise essentially two side walls 8, 9 and 10, 11 each. In their rear area facing the baseplate, the side walls 8, 9 and 10, 11 have a greater distance, in which the brake pedal 6 and the clutch pedal 4 are accommodated. The side walls 8, 9 and 10, 11, just as the distance between them, are traversed by the respective pivot axes 5 and 7. The side walls 8 and 9 as well 10 and 11 are converged by means of oblique planes in the front area facing the passenger cell and they form a respective holding strap 12 and 13.

The holding strap 12, 13 is used to fasten the pedal block 1, 2 to a transverse bar of a motor vehicle, by means of through holes arranged within the holding strap. The transverse bar is not shown more specifically here.

The two side walls 8 and 9 form a common holding strap 12 at the pedal block 1. The pedal block 2 has an identical design corresponding to the pedal block 1, and the two side walls 10 and 11 form a common holding strap 13. The pedal blocks 1, 2 with the corresponding side walls 8, 9 and 10, 11 form a common, one-piece assembly unit with the baseplate 3, and the side walls 8, 9, 10, 11 made of sheet metal are injection molded in the respective plastic pedal block 1 and 2. The cross-sectional view in FIG. 5 along line C—C from FIG. 2 makes it clear that the side walls 8, 9 and 10, 11 are connected to the respective pedal block 1 and 2 by means of a bent end area of the side walls 8, 9 and 10, 11. The bent area is used to increase the rigidity in the area of the connection between the plastic and the sheet metal.

FIG. 1 also shows clearly that the holding device has a gas pedal 14 as an additional actuating instrument besides a clutch pedal 4 and a brake pedal 6. The gas pedal 14 is part of a so-called E gas module 15, which is provided as an electronic assembly unit for detecting the position of the gas pedal and transmitting the data thus obtained to downstream assembly units. The E gas module 15 is a prefabricated assembly unit and is placed on a mounting plate 16, which is an integral part of the baseplate 3 in the example being shown. However, the E gas module may, of course, also be fastened subsequently to the baseplate 3.

The mount for a pivot axis 5, 7 of the pedal 4, 6, which mount is made of two side walls 8, 9 and 10, 11 located opposite each other, consists of sheet metal and is injection molded in the pedal block 1, 2, forms a hole each, which is coated with plastic during the manufacture of the holding device and acts as a bearing element 31 after the completion of the holding device. This means that the bearing element 31, which is a bearing bush here, as is apparent from FIG. 1, is formed directly during the manufacture of the holding device in an injection molding operation. The webs 32 are the connection to the plastic pedal block 1, 2.

Figure 2:
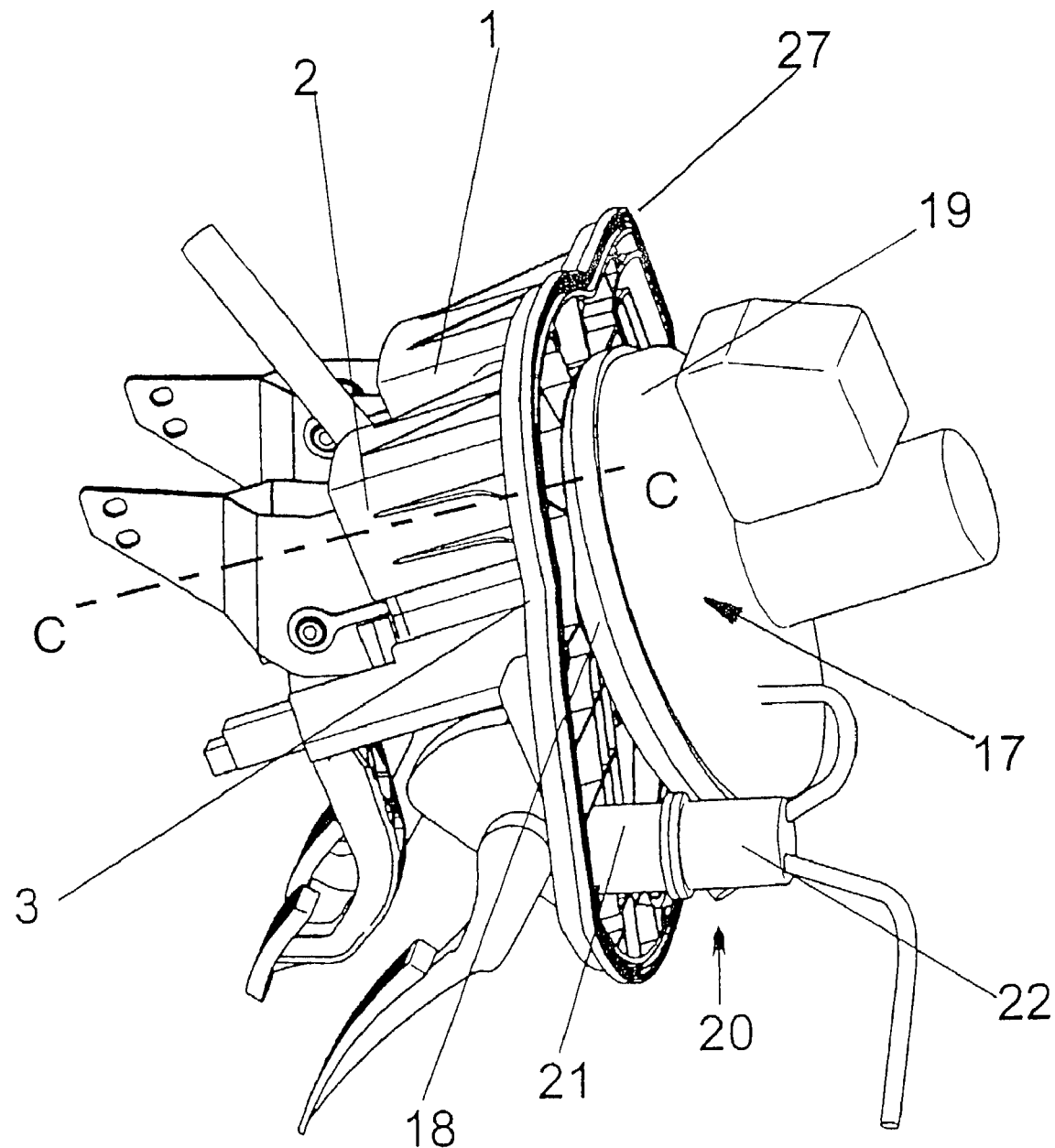
FIG. 2 is a perspective side view corresponding to arrow Y in FIG. 1.

The lateral perspective view in FIG. 2 shows, on the one hand, the pedal blocks 1 and 2 as well as the baseplate 3 as the essential components. This figure also shows clearly that a brake booster housing 17 is arranged on the rear side of the baseplate 3, which faces away from the pedal blocks 1, 2 and points in the direction of the engine compartment. The brake booster housing 17 has a two-part design and has a lower part 18 on the baseplate side as well as an upper part 19 placed thereon. The lower part 18 may, of course, also be an integral part of the baseplate 3 of the holding device, and a brake booster housing 17 made on the whole in one piece with the baseplate 3 is also within the scope of the present invention.

Moreover, a vacuum tank, which is designated by 20 as a whole and is used as a pressure storage means especially in modern diesel-powered vehicles, is arranged on the rear side of the baseplate 3. The vacuum tank 20 has a two-part design and comprises a lower part 21 and an upper part 22. The lower part 21 is integrated within the baseplate 3 here and the upper part 22 is placed on the lower part 21 and is welded to same.

Figure 3:
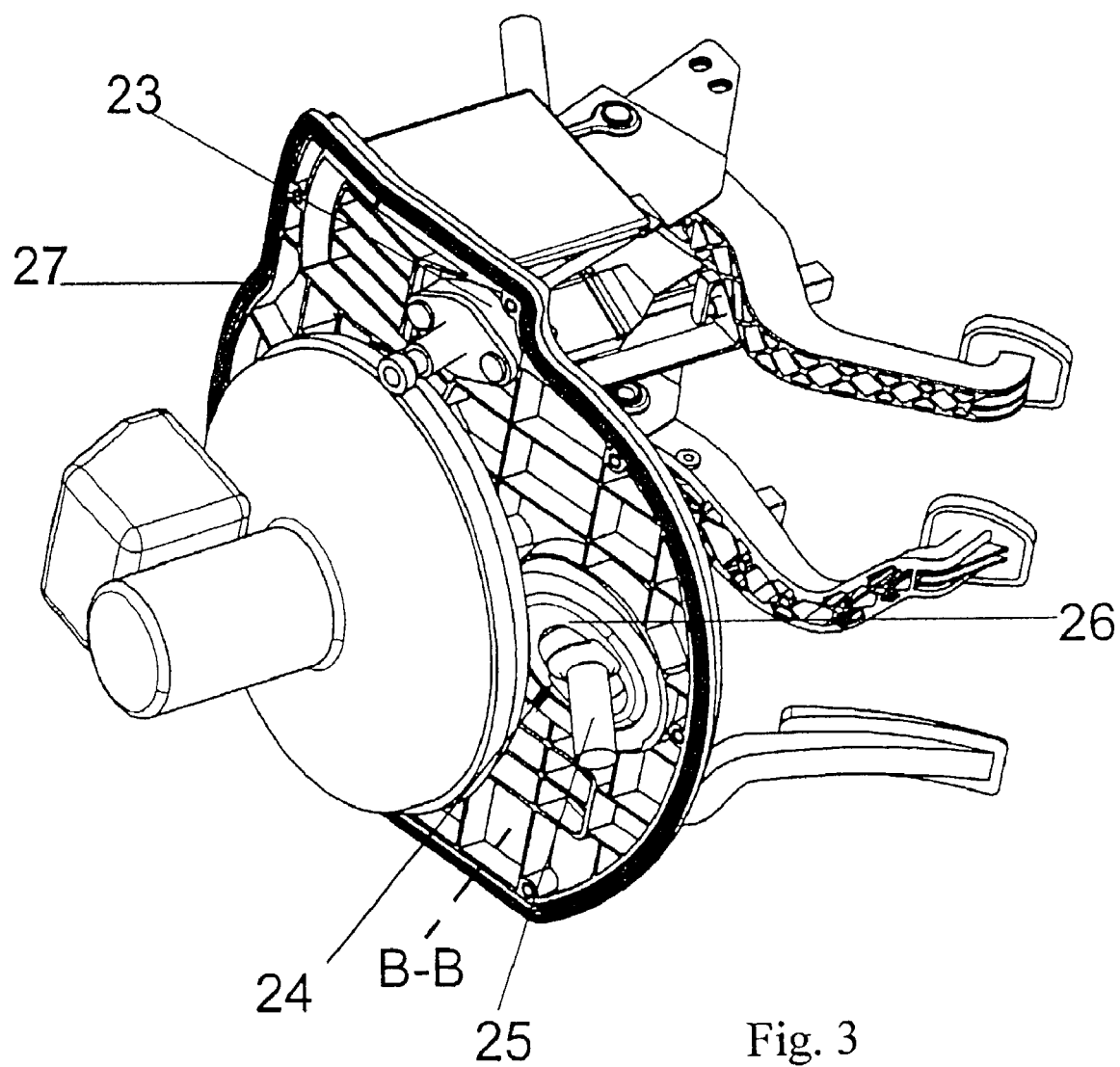
FIG. 3 is a synoptic perspective view of the holding device as viewed from the engine compartment side facing away from the passenger cell side.

Moreover, the housing 23 of a clutch master cylinder, whose arrangement can be seen from the perspective view in FIG. 3, is located on the rear side of the baseplate 3 facing away from the engine compartment. In addition, this figure also shows that the baseplate 3 of the holding device has an opening 24, which is provided for passing through a steering cross-shaft 25. The steering cross-shaft 25 is part of the steering column of the corresponding vehicle and at its two free ends, it has connection means for the upper and lower parts of the motor vehicle steering column, which are not shown specifically here for clarity's sake. The steering cross-shaft 25 is placed in the opening 24 of the baseplate 3 during the preassembly of the entire module of the holding device, and a seal 26 that extends around the steering cross-shaft 25 and closes the opening is placed to seal the opening 24 and is fastened to the baseplate 3 by means of suitable fastening means. The seal 26 is designed such that due to its rigidity, it can hold the steering cross-shaft 25 in its position in the opening 24 of the baseplate 3 during the preassembly and the transportation of the entire holding device. In addition, the seal 24 is used to muffle the noises occurring in the engine and, e.g., for sealing against the penetration of moisture or gas from the engine compartment.

To achieve an additional reduction in the engine noises, the baseplate has a circular seal 27 on the rear side facing the engine. The seal 27 is injection molded on the baseplate 3 according to the 2 C process during the manufacture of the injection-molded part of the baseplate 3.

Figure 4:
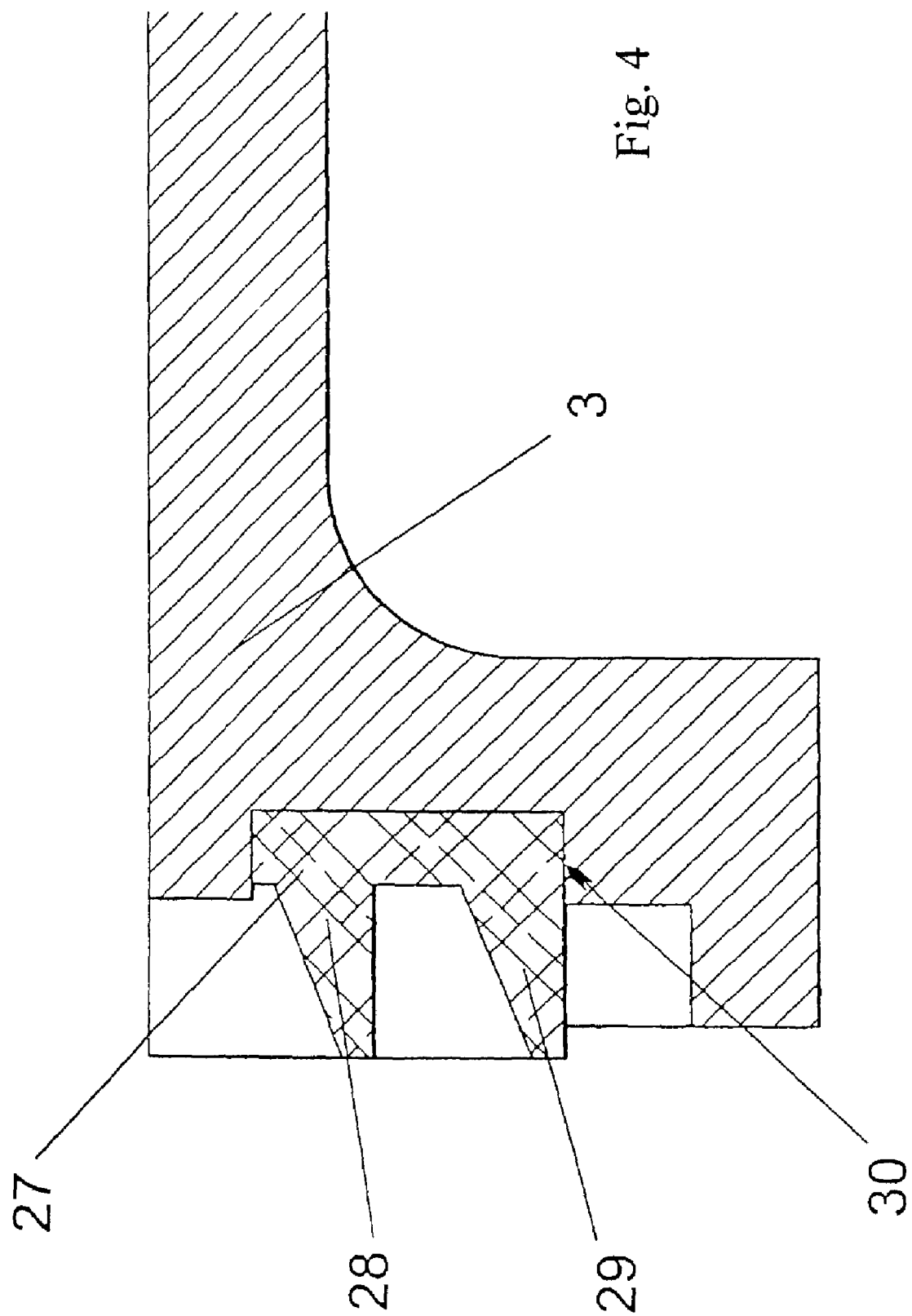
FIG. 4 is a sectional detailed view corresponding to line B—B in FIG. 3.

The cross section of the baseplate is shown in an enlarged view in FIG. 4 in its edge area with the seal 27 injection molded there, the view in FIG. 4 corresponding to a cross section along line B—B in FIG. 3. This figure shows that the seal 27 has two sealing lips 28 and 29 and is introduced into a groove 30 of the baseplate with its underside facing away from the sealing lips 28, 29. According to an advantageous embodiment, the material of the seal 27 may be tetrapoly-ethylene (TPE), and this material harmonizes especially well with the polyamide (e.g., PA 66 GF 35) of the baseplate 3 during the manufacture of the baseplate 3.

While a specific embodiment of the invention have been shown and described in detail to illustrate the application of the principles of the invention, it will be understood that the invention may be embodied otherwise without departing from such principles.

The invention claimed is:

1. A motor vehicle pedal mechanism holding device, comprising:
   a pedal block;
   a pedal fixed to the pedal block pivotably; and
   a baseplate, said baseplate and said pedal block being made of plastic in one piece, said pedal block having a mount holding a pivot axis of said pedal, said mount having two side walls located opposite each other formed of sheet metal and being injection molded in said pedal block such that said plastic is molded at least partially around said mount and also is fixed to said two side walls, a portion of said mount extends away from said plastic, the device further comprising a housing of a clutch master cylinder integrated in said baseplate.

2. A holding device in accordance with claim 1, wherein said baseplate has a seal injection molded according to a two component process on its rear side facing away from said pedal block for sealing an opening provided in the motor vehicle body for said baseplate.

3. A holding device in accordance with claim 1, wherein said mount for said pivot axis of said pedal is formed by two sheet metal side walls located opposite each other injection molded in said pedal block with a hole injection coated with plastic during the manufacture of the holding device and forming a bearing element after the completion of the holding device.

4. A holding device in accordance with claim 3, wherein; said bearing element is connected to said pedal block by webs.

5. A holding device in accordance with claim 1, wherein said baseplate has a mounting plate for an electronic module unit for detecting the position of the gas pedal and for transmitting the data thus obtained to one or more down-stream assembly units.

6. A holding device in accordance with claim 1, wherein said baseplate has mounts for devices.

7. A holding device in accordance with claim 1, wherein; said side walls include ends with bent areas, said side walls are connected to said pedal block by said bent areas.

8. A motor vehicle pedal mechanism holding device, comprising:
   a pedal block;
   a pedal fixed to the pedal block pivotably; and
   a baseplate, said baseplate and said pedal block being made of plastic in one piece, said pedal block having a mount holding a pivot axis of said pedal, said mount having two side walls located opposite each other formed of sheet metal and being injection molded in said pedal block such that said plastic is molded at least partially around said mount and also is fixed to said two side walls, a portion of said mount extends away from said plastic, wherein said baseplate has a vacuum tank.

9. A motor vehicle pedal mechanism holding device, comprising:
   a pedal block;
   a pedal fixed to the pedal block pivotably; and
   a baseplate, said baseplate and said pedal block being made of plastic in one piece, said pedal block having a mount holding a pivot axis of said pedal, said mount having two side walls located opposite each other formed of sheet metal and being injection molded in said pedal block such that said plastic is molded at least partially around said mount and also is fixed to said two side walls, a portion of said mount extends away from said plastic, wherein said baseplate has an opening for a steering cross-shaft, wherein said opening has a seal that extends around said steering cross-shaft and seals said opening when said steering cross-shaft is installed.

10. A motor vehicle pedal mechanism holding device, comprising:
    a pedal block;
    a pedal with a pedal axis structure; and
    a baseplate, said pedal block having a pedal axis mount supporting said pedal axis structure to define a pedal pivot, said pedal axis mount having two side walls located opposite each other formed of sheet metal with said sheet metal of said side walls plastic injection molded in said pedal block to form a unitary one piece plastic baseplate and pedal block such that said plastic is molded at least partially around said mount and also is fixed to said two side walls, a portion of said mount extending away from said plastic, further comprising integrating a housing of a clutch master cylinder in the baseplate.

11. A holding device in accordance with claim 10, wherein said mount has a hole injection coated with plastic during the manufacture of the holding device and forming a bearing element after the completion of the holding device.

12. A holding device in accordance with claim 10, wherein:
    said side walls converge toward each other by oblique planes and form a holding strap.

13. A motor vehicle pedal mechanism holding device, comprising:
    a pedal block;
    a pedal with a pedal axis structure; and
    a baseplate, said pedal block having a pedal axis mount supporting said pedal axis structure to define a pedal pivot, said pedal axis mount having two side walls located opposite each other formed of sheet metal with said sheet metal of said side walls plastic injection molded in said pedal block to form a unitary one piece plastic baseplate and pedal block such that said plastic is molded at least partially around said mount and also is fixed to said two side walls, a portion of said mount extending away from said plastic, the device further comprising integrating a vacuum tank with said baseplate.

14. A motor vehicle pedal mechanism holding device comprising:
a pedal block;
a pedal fixed to the pedal block pivotably; and
a baseplate, said baseplate and said pedal block being made of plastic in one piece, said pedal block having a mount holding a pivot axis of said pedal, said mount having two side walls located opposite each other formed of sheet metal and being injection molded in said pedal block such that said plastic is molded at least partially around said mount and also is fixed to said two side walls, a portion of said mount extends away from said plastic, wherein:
said baseplate has a seal injection molded according to a two component process units rear side facing away from said pedal block for sealing an opening provided in the motor vehicle body for said baseplate;
said base plate defines a groove; and
said seal has two sealing lips and is introduced into said groove of said baseplate with its underside facing away from said sealing lips.

15. A pedal mechanism holding device comprising:
a baseplate formed of injection molded plastic;
a pedal block mounted on said baseplate, said pedal block having two side walls formed of sheet metal, said plastic being injection molded around said side walls such that said side walls are partially embedded in the plastic, said side walls including a pivot axis mount for a pedal pivot axis;
a pedal pivotally mounted in said pedal block pivot axis mount about said pivot axis, wherein;
said pedal block is mounted on a first side of said base plate;
said base plate has a second side diametrically opposite said first side, said second side defines a groove;
a seal is arranged in said groove on said base plate, said seal being injection molded with said base plate by a two component process, said seal including two sealing lips extending away from said second side of said base plate.

16. A device in accordance with claim 15, wherein:
said pedal block also includes injection molded plastic, said base plate and said pedal block being injection molded in one piece around said sidewalls.

17. A device in accordance with claim 16, wherein:
said pedal block includes a bearing element for pivotal movement of said pedal, said bearing element being formed of said injection molded plastic during an injection molding of said base plate;
a web connects said bearing element to said injection molded plastic of said pedal block.

18. A device in accordance with claim 15, wherein:
a portion of said side walls extends out of said injection molded plastic.

19. A device in accordance with claim 15, wherein:
said side walls each have a first portion spaced from each other, said side walls each have a second portion connected to each other to form a holding strap, said side walls converge toward each other from said first portion to said second portion in oblique planes.

20. A device in accordance with claim 15, wherein:
said side wall have ends embedded in said plastic of said base plate, said ends of said side walls having a bent area embedded in said plastic of said base plate.

* * * * *